United States Patent [19]

Mihaljevic

[11] 4,142,319

[45] Mar. 6, 1979

[54] SPOON-TYPE FISHING LURE WITH OFFSET TAIL

[76] Inventor: Miroslav Mihaljevic, 526 Orchard Ave., Palisades Park, N.J. 07650

[21] Appl. No.: 793,292

[22] Filed: May 3, 1977

[51] Int. Cl.² ............................................. A01K 85/00
[52] U.S. Cl. .................................. 43/42.39; 43/42.49; 43/42.5
[58] Field of Search .................. 43/42.39, 42.15, 42.2, 43/42.22, 42.37, 42.45, 42.49, 42.5, 42

[56] References Cited

U.S. PATENT DOCUMENTS

| | | | |
|---|---|---|---|
| 2,587,366 | 2/1952 | Montali | 43/42.2 |
| 3,153,876 | 10/1964 | Multanen | 43/42.49 |
| 3,192,660 | 7/1965 | Guess | 43/42.49 |
| 3,432,957 | 3/1969 | Marino | 43/42.2 |
| 3,834,058 | 9/1974 | Gaunt | 43/42.49 |

Primary Examiner—Nicholas P. Godici
Assistant Examiner—Roscoe V. Parker, Jr.
Attorney, Agent, or Firm—Kenyon & Kenyon, Reilly, Carr & Chapin

[57] ABSTRACT

A fishing lure having a spoon-shaped blade with a first attachment location for a fishing line and a second attachment location spaced from the first location includes an offset tail in the form of an elongated stiff member having a first end firmly attached to the blade at the second attachment location and a second end carrying a loosely attached hook. The stiff member extends away from the blade in a direction such that the center of gravity of the member is offset with respect to an extension of a line between the first attachment point and the second attachment point. The offset tail causes the lure to trail through the water in a sinuous path with realistic short side-to-side darting motions. The stiff member may be made of wire, with beads of brass, or other material heavier than water, strung along the wire, preferably in order of increasing size from the first end to the second end. This arrangement places the center of gravity of the lure near the hook, thereby causing the lure to travel hook-first when cast, and reducing the chance of entangling the hook in the line.

20 Claims, 11 Drawing Figures

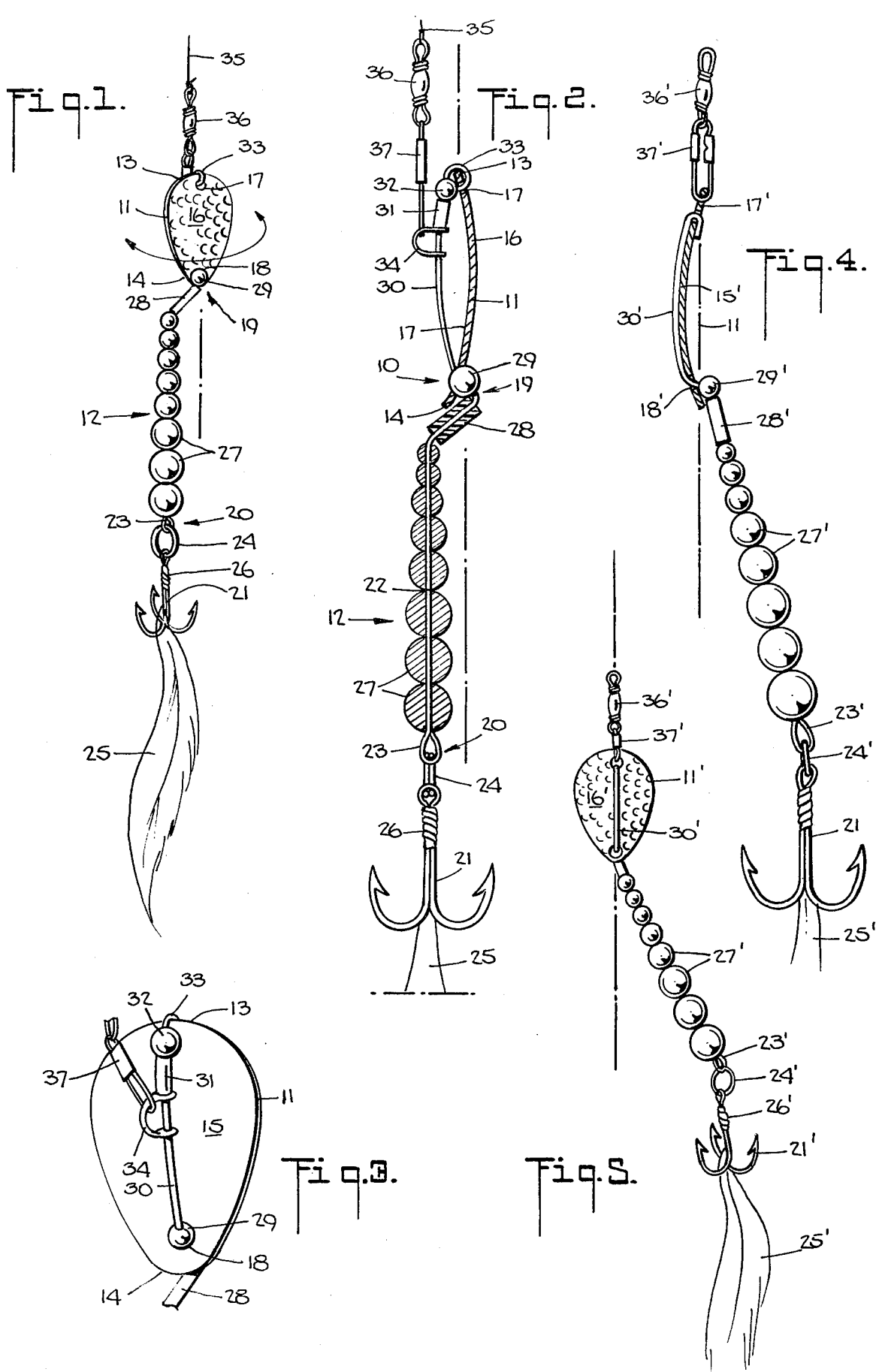

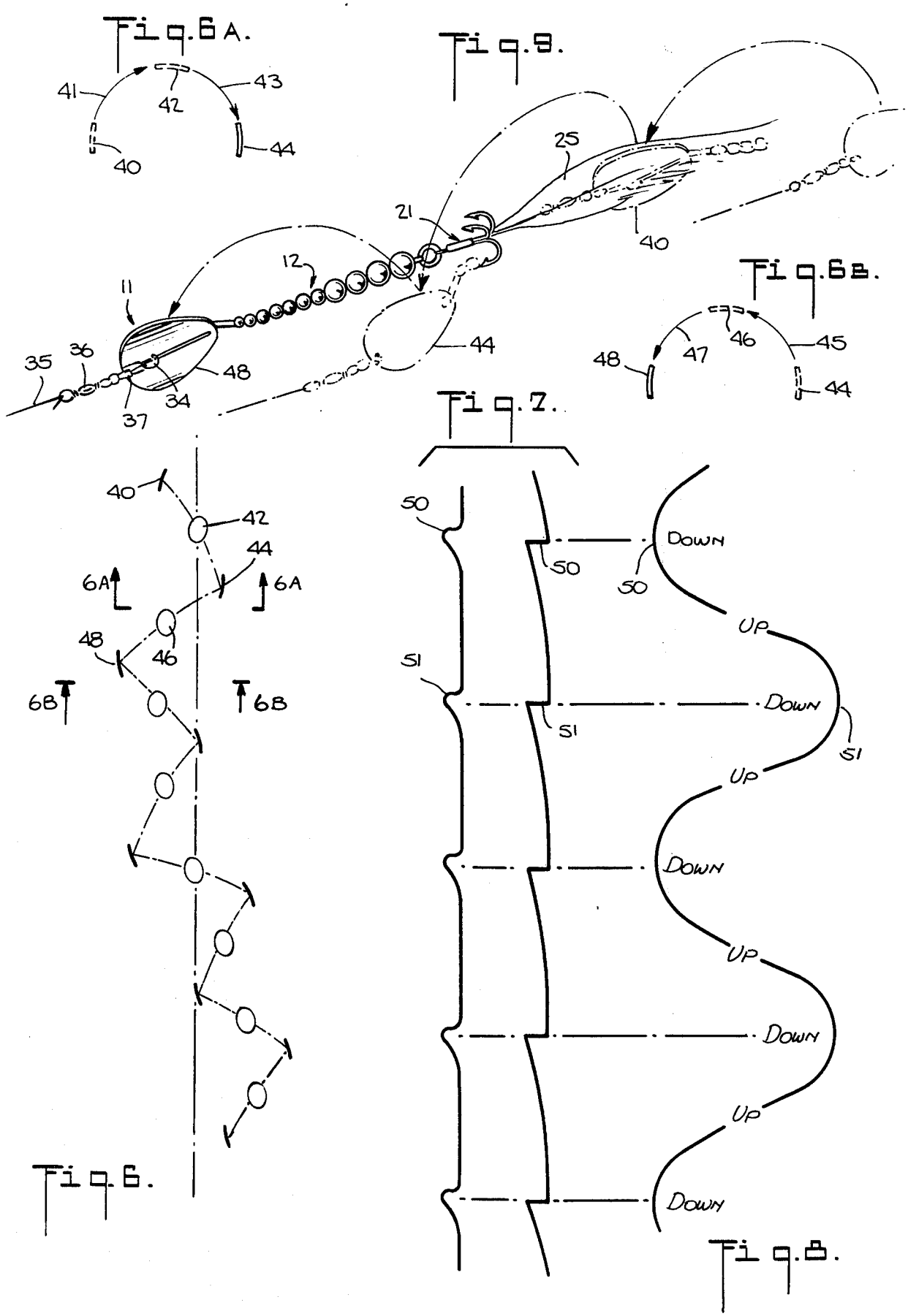

SPOON-TYPE FISHING LURE WITH OFFSET TAIL

BACKGROUND OF THE INVENTION

1. Field of the Invention

The present invention relates to fishing lures and specifically to simulated-fish, spoon-shaped blade lures.

2. Description of the Prior Art.

There is a well known type of fishing lure that has a body member of shiny sheet metal which has been dished or spooned so that one side is concave and the other is convex. The body member is usually roughly oval in shape, with different lures having different proportions of width to length, depending on the size and type of fish being simulated.

Normally the body member of such spoon-type lures has a hole near the edge at one end adapted to be attached to a fishing line or leader, usually by means of a swivel, to permit the spoon to spin freely without twisting the line. The other end of the spoon carries a hook or set of hooks attached by a ring through a second hole.

The purpose of the spoon-like body member is to create an erratic twisting motion as the lure is drawn through the water, either by first casting and then reeling in or by trolling from a moving boat. The hoped-for effect is that of the movement of small live creatures of the type fish feed upon, flashing and darting through the water. Although the spoon-type lures can give satisfactory results they do not provide a truly accurate simulation of the creatures fish feed upon since the spinning motion is distinct from the random oscillating motions of the creatures.

SUMMARY OF THE INVENTION

It is an object of the present invention to provide an improved spoon-type fishing lure which will more accurately simulate the typical path of a small creature swimming through the water.

It is a further object of the invention to provide a spoon-type fishing lure that superimposes a relatively rapid side-to-side motion on an undulating path of longer period and larger amplitude when the lure is towed through the water.

Another object of the invention is to provide a spoon-type lure of substantial weight to obviate the need to fasten additional weights to the line.

Another object of the invention is to provide a spoon-type lure having a center of mass on the hook side of the spoon so that the hook end will lead the spoon when the lure is cast, thereby minimizing the likelihood of the hook catching in the line.

The foregoing and other objects are achieved in a improved fishing lure that includes a spoon-shaped blade and a hook, the blade having a first attachment location for a fishing line and a second attachment location, spaced from the first location, for the hook. The improved lure comprises an elongated stiff member having one end rigidly attached to the blade at the second attachment location, the stiff member extending away from the blade in a direction such that the center of gravity of the member is offset with respect to an extension of a line between the first and second attachment locations, and means for attaching the hook to the other end of the stiff member.

Preferably the length of the stiff member, which shall be referred to as the tail of the lure, is greater than the maximum dimension of the blade (by as much as a ratio of 2:1), and the mass of the tail is preferably greater than the mass of the blade. The mass may be distributed over the length of the tail, but with the center of gravity displaced from the geometrical center toward the hook end of the tail.

A preferred construction of the stiff tail member comprises a stiff wire having at least one bead and preferably a plurality of beads strung from one end to the other. The beads may be of any suitable material that is heavier than water. One preferred material is brass. By use of beads of graduated, progressively increasing, size from the first end to the second end, the center of mass is automatically shifted toward the outer end (i.e. the hook end).

For best results with regard to realistic motion in the water, the spoon-shaped blade has an axis of symmetry that lies in a plane defined by the edge of the spoon and extends through the first and second attachment points. The axis of the stiff tail member makes an acute angle with the axis of symmetry of the blade and also with the defining plane of the axis of symmetry.

In one preferred construction, the first end of the stiff wire of the tail is attached to the blade by inserting it through a hole at the second attachment point and then extending it, contiguously to the convex side of the spoon to another hole through the spoon at the first attachment point. Alternatively the wire may extend between the first and second attachment points straight across the concave side of the spoon (i.e., the bowl of the spoon), and means for attaching the lure to the fishing line may be slidably mounted on this portion of the wire.

The foregoing and other features of the present invention will be described in more detail in connection with the drawings.

BRIEF DESCRIPTION OF THE DRAWINGS

FIG. 1 is an elevation view of the embodiment of the spoon-type lure of the invention, as suspended from a fishing line, looking at the convex side of the spoon.

FIG. 2 is a side elevation, in section, of the embodiment of FIG. 1.

FIG. 3 is an enlarged view of the convex side of the spoon of the embodiment of FIG. 1, showing the detail of the sliding means for attaching a fishing line to the lure.

FIG. 4 is a side elevation view of an alternative embodiment of the invention.

FIG. 5 is an elevation view of the embodiment of FIG. 4 looking at the concave side of the spoon.

FIG. 6 is a simplified plan view of the typical zig-zag path taken by the embodiment of FIGS. 1-3 when drawn through the water.

FIG. 6A is an elevation view of the path of FIG. 6 taken along line A—A.

FIG. 6B is an elevation view of the path of FIG. 6 taken along line B—B.

FIG. 7 is an elevation view of a typical path taken by the embodiment of FIGS. 4 and 5 when drawn through the water.

FIG. 8 is a plan view of the path of FIG. 7.

FIG. 9 is a perspective view of the path of FIG. 7.

DETAILED DESCRIPTION OF THE PREFERRED EMBODIMENTS

With reference to FIGS. 1-3, a preferred embodiment of the invention is a fishing lure 10 having a spoon-shaped blade 11 and a stiff tail member 12. Blade 11 is a conventional lure component in the form of a roughly teardrop-shaped piece of shiny sheet metal having a broad end 13 and a narrow end 14. The blade is dished, the surface of the concave side 15 being smooth, and the surface of the convex side 16 being dimpled.

The blade has a first attachment point 17, in the form of a hole through the sheet metal adjacent to the edge at the broad end of the spoon. A second attachment point 18, in the form of a second hole, is located adjacent to the edge at the narrow end of the spoon.

As shown most clearly in FIG. 2, the tail member 12 has a first end 19 secured to the spinner at the second attachment point 14 and a second end 20 to which a triple-barbed hook 21 is attached. The tail member is made from a stiff stainless steel wire 22 having a loop 23 forming the second end of the tail. The hook is loosely coupled to this loop by a split ring 24, so that it can pivot freely. A long feather 25 is tied to the shank of the hook by a thread wrapping 26.

From loop 23 at the hook end of the tail member, the stiff wire has a straight portion on which are strung a plurality of spherical brass beads 27. The beads may be made of other materials that are heavier than water, if desired, and they may have other shapes than spherical. The spherical brass beads shown in the drawing, however, have been found to provide extremely satisfactory results. The beads may be left plain, or they may be painted or otherwise covered with a protective and decorative coating.

The beads may be of uniform size, but it is preferable that they be of different sizes, progressively graduated in decreasing increments from the hook end to the spinner end of the tail member. At the upper, first end of the tail member, a piece of plastic tubing 28 is slipped over wire 22, after the desired number of beads are strung, to serve as a spacer. Above the tubing, a single bead 29, larger than the hole at attachment point 18, is strung on the wire to hold the other beads and the spacer tightly together.

A portion 30 of wire 22 extends above bead 29. This portion is inserted through the hole at the second attachment point 18, from the convex to the concave side, until bead 29 is snugly seated in the hole of the convex side of the spoon. An additional short piece of plastic tubing 31 and an additional single bead 32 are slipped over the upper end of wire portion 30, the end then being passed through the hole at the first attachment point, with bead 32 seated snugly in the hole. and then the wire is turned back on itself to form a loop 33 to firmly attach the upper end of the stiff wire to the first attachment point.

The result is a stiff tail member that is rigidly attached to the blade at the second attachment point 18. The portion 30 of wire 22 that extends between the attachment points also provides a guide for a U-shaped slider 34 which has been slipped onto the wire before the additional piece of tubing and additional bead. The slider serves as a means for attaching a fishing line 35, preferably by the use of a conventional snap swivel 36.

In FIGS. 4 and 5 an alternative embodiment of the invention is illustrated. All components of this embodiment that are the same as the corresponding components of the embodiment of FIGS. 1–3 are identified by the same numeral, followed by a prime.

In this other embodiment the construction is essentially the same as that of the first embodiment, except for the manner of attaching the stiff wire of the tail member to the spoon and the manner of attaching the lure to a fishing line. Thus, the stiff wire has a loop 23' formed in its lower end, has a plurality of brass beads 27' strung on the wire above the loop, and has a plastic spacer tube 28' and the additional bead 29' slipped on above the plurality of beads 27.

The manner of attachment to the second attachment point on the spoon differs, however, in that the upper portion 30' of the wire is inserted through the hole from the concave side of the spoon and extends contiguously along the convex side to the hole at the first attachment point 17, where it is hooked through and turned down against the surface of the concave side. The remaining portion of the hole provides room for attachment of a snap swivel 36'.

Another difference between the two illustrated embodiments is the positional relation of the stiff tail member to the spoon of the lure. In the first embodiment, the tail has a short but sharp bend adjacent to bead 29 and a second bend at the top of the group of beads 27. In the second embodiment, the tail extends straight from the bead 29' to the loop 23' at the hook end.

In each embodiment, however, the tail is offset from an axis of symmetry which represents an extension of a line 38 or 38' drawn between the first and second attachment points. In the first embodiment, the offset is in a plane perpendicular to the plane of the edge of the spoon. In the second embodiment, the offset is at an acute angle with respect to both the plane of the edge of the spoon and the plane perpendicular to the edge of the spoon.

Other positional relations are possible within the scope of the invention, the important criterion being that the center of mass of the tail member of offset with respect to the line between the first and second attachment points.

The effect of this offset is illustrated in FIG. 6, which illustrates the typical path of the lure embodiment of FIGS. 1–3, and FIGS. 7 and 8, which show the path followed by the lure of FIGS. 4 and 5.

With reference to FIG. 6, movement of the lure relative to the water is shown from top to bottom of the page. At initial position 40, the lure is positioned with the plane of the blade substantially vertical and the concave side of the spoon facing to the right. The lure then follows an upwardly arched path 41 to the right of the line of pull. Simultaneously, the spoon rolls over until the concave side faces down at position 42.

The spoon continues to roll as the lure follows path 43 to position 44. At this position the plane of the blade is again approximately vertical, but the concave side now faces to the left. The motion during this "zig" portion of the path is shown in elevation by FIG. 6A.

From position 44, the lure reverses direction and follows an upwardly arched path 45 back to the left. At the same time, the spoon rolls back over until the concave side faces down at position 46. As before, the spoon continues to roll, with the lure following path 47 until it reaches point 48. The cycle then repeats.

The reason for this zig-zag motion is that when the plane of the spoon is vertical, the center of mass of the tail is offset laterally, thereby exercising a torque tending to rotate the spoon until the concave side faces down. At the same time, lift forces caused by water flowing over the convex side of the spoon cause the lure to rise. The rolling motion continues until the plane of the spoon is again approximately vertical. In this position, the lifting forces are acting laterally, tending to pull the lure sideways, At this point, the forces acting on the lure are reversed from the initial position, causing it to move back in the opposite direction. The direction of rotation also reverses; so that the lure does not spin but rather rolls from side to side through approximately 180° of rotation.

In the embodiment of FIGS. 1-3, the tail is aligned with the blade axis when viewed perpendicularly to the plane of the blade (FIG. 1), and it is offset only slightly from, and extends parallel to, the axis when viewed in the plane of the blade (FIG. 2). This results in a relatively slow and languorous zig-zag and up-down swimming motion.

The tail in the embodiment of FIGS. 4 and 5, on the other hand, is offset from the blade axis when viewed both parallel and perpendicular to the plane of the blade (FIGS. 4 and 5, respectively). The tail is offset at an angle, in addition, which causes the plane of the blade to be inclined with respect to the line of pull, giving the spoon a negative angle of attack. As a result, the movement of this latter embodiment is faster, with abrupt sinking action as the lure reaches the limit of each side excursion, as shown in FIG. 7.

The two paths of FIG. 7 are alternative elevation profiles. In the left-hand profile, both the loss and recovery in elevation at point 50 are rapid. In the right-hand profile, the loss in elevation is rapid, but the recovery is gradual until the lure reaches point 51 on the other side of its horizontal path (FIG. 8).

The preferred method of fishing with the lure of this invention is described as follows.

When the lure is used in a body of water where any kind of current exists, the lure will be aboe to perform by using the current advantage as a power source to create movements of the lure which will be explained as follows:

When the lure is cast across the current, the depth of the lure should be controlled by lowering or raising the tip of the fishing pole, and at the same time, cranking the handle of a reel in a counterclockwise direction to let the lure swim with the current across the river to the opposite shore line. From there-it is fished to a point where the line comes almost parallel with the location of the fisherman. From that point it is necessary to crank the handle of the reel in the clockwise direction very slowly, stopped at times until the lure sinks down toward the desired depth. As the line is pulled, the lure will swim away from the bottom up, when cranking is stopped the lure will swim toward the bottom again. Alternatively, the tip of the fishing pole may be raised up, which will bring the lure to the top, and the current will force the lure into continuous movements without cranking. The depth can be changed by lowering or raising the tip of the fishing pole; so the lure will swim toward the bottom and away from the bottom without cranking. The lure is designed in such a way that it never spins around. The swivel is used for a totally different purpose, and it is strongly recommended to be used at all times, as it is part of the lure.

In a body of water where current does not exist, the basic motion is in a zig-zag direction. At the same time, movement is also, according to the pull of the line by lowering and raising the tip of the fishing pole, toward the bottom and away from the bottom, while never losing the zig-zag motion. Thus, the lure provides two types of movements, continuous zig-zag direction plus swimming toward the bottom and away from the bottom. There is a third kind of movement not previously mentioned. This is created by changing the angle of pull horizontally. This movement is best described as a "snake movement". This movement results because changing the horizontal angle of pull on the lure changes the center of pull, and by so doing the lure is forced into a temporarily different kind of motion which is very unusual. The recovery of the lure is quick; so it continues to swim as was described in the first two motions. That quick change from two basic movements to the third motion unually triggers a fish to strike the lure, because the fish associates the changed movement of the lure as something swimming being in trouble.

As this lure swims through the water, it also creates a sound that is similar to the sound of a hellgrammite or a crawfish, due to the metal parts of the lure rubbing against each other. The peak sound happens when the snake movement is applied. The reason is that in the snake movement, the center of pull is changed to the left or right of the regular pull, and in this position the swivel momentarily touches the blade, which creates a sound that differs from the regular sound which exists when the lure is swimming in the first two motions earlier described.

It is advisable to use a light action fishing pole with no heavier than 8 pounds test line when fishing this lure. With such equipment, a fisherman will be able to feel the movements of the lure in the earlier described two swimming movements. The rod tip will vibrate, but when the snake type motion is applied, the vibrations will stop. When this happens, the fisherman will know that he has achieved the snake motion.

When the lure is fished against the current (which differs from the previously explained technique of fishing across the current), the fisherman, after completing a cast into shallow water against the current, has absolute control over the depth of the swimming lure by raising the fishing pole tip high over his head or by increasing the normal speed of pulling; so the lure will swim near or on the top of the water. Other lures on the market in the same weight category (except floating lures) are not conditioned to do as this lure does, and are forced by the current down to the bottom. This may end with the disappointment of losing the lure.

It is necessary to mention the feather or fly design even though it is very simple, for it is not without a good reason. Any fly bulkier than that illustrated would create water resistance. It has to be slim line to assure non-resistant swimming through the water. If a bulky type of fly is attached, it will interfere with the previously-mentioned motions that are desirable. In addition, under some conditions plain triple hooks, or a double hook, or even a single hook can be attached and still achieve fish catching results. Also, in the embodiment of FIGS. 1-3, where the blade axis and the body are exactly parallel, by changing that parallelness to an angle of one or two degrees, which is slightly noticeable, a fisherman can achieve different motions that would not drastically change the above-mentioned motions but will be either faster or slower, depending on what one wants to try with faster swimming or slower swimming. Thus, it is an adjustable lure and can be adjusted by the user.

The arrangement, previously mentioned, of placing the beads in ascending order of size from the spoon to the hook end of the tail provides another advantage to the lure. This advantage results from having the center of mass of the lure offset toward the hook end. This tends to cause the hook end of the lure to lead the rest of the lure when it is in the free flight phase of a cast. Since the fishing line follows the lure during this phase of a cast, the hook is thereby kept out of an entangling encounter with the fishing line.

It will be apparent that the desirable features and advantages of the invention can be obtained by different constructional details than those illustrated by the preferred embodiments. Thus other tail assemblies, which have a center of mass offset both laterally, from the axis of symmetry, and longitudinally, from the center of the tail toward the hook end, may conform to the requirements of the invention as claimed. In addition, the first end second attachment points of the spoon can be reversed; so that the line swivel is attached to the narrow end, and the tail is attached to the broad end of the spoon.

The lure can be made in a range of sides, depending oh the type of fish being sought. For illustrative purposes, and not by way of limitation, very successful results in stream fishing have been obtained with lures having a spoon approximately 15/16" long, a tail approximately 1¾" long strung with brass beads ranging from approximately ⅛ to 9/32 inch in diameter, and a size No. 6 Mustad-Treble Round Hook. The hook is attached to the tail with a No. 4 split ring, and the line is attached to the spoon with a No. 14 snap swivel.

I claim:

1. An improved fishing lure of the non-floating type that includes a metal blade, the blade being shaped like the bowl of a spoon with a convex surface and an opposite coextensive concave surface, the two surfaces terminating in a common perimetral edge, the blade having a first attachment located, means for connecting a fishing line to the first attachment location, a second attachment location on the blade, adjacent to the edge thereof and spaced from the first location, and means for connecting a fish hook to the second attachment location, wherein the improvement comprises:

said means for connecting a fish hook to the second attachment location comprising an elongated stiff weighted tail member, heavier than the blade and having one end rigidly attached to the blade at said second attachment location, the member extending away from the blade in a direction such that the center of gravity of the member is offset with respect to an extension of a line between the first and second attachment locations, and means for attaching a fish hook to the other end of the stiff tail member, whereby the leverage exerted by the elongated stiff weighted tail member on the blade is adapted to cause the lure to oscillate in a rolling motion about a line of pull from a fishing line attached to the first attachment location while preventing the blade from spinning.

2. A fishing lure according to claim 1 wherein the length of the stiff tail member is greater than the maximum dimension of the blade.

3. A fishing lure according to claim 1 wherein the mass of the stiff tail member is distributed over the length thereof.

4. A fishing lure according to claim 1 wherein the center of gravity of the stiff tail member is displaced from the geometrical center of the member toward the other end thereof.

5. A fishing lure according to claim 1 wherein the elongated stiff tail member comprises a stiff wire.

6. A fishing lure according to claim 5 wherein the elongated stiff tail member further comprises at least one bead strung on the wire.

7. A fishing lure according to claim 5 wherein the elongated stiff tail member further comprises a plurality of beads strung contiguously on the wire from the one end of the member to the other end.

8. A fishing lure according to claim 7 wherein the plurality of beads are of graduated size, increasing from the one end to the other end of the stiff tail member.

9. A fishing lure according to claim 1 wherein the line between the first and second attachment locations coincides with an axis of symmetry of the blade.

10. A fishing lure according to claim 9 wherein the axis of symmetry between the first and second attachment points lies in a plane defined by the edge of the blade.

11. A fishing lure according to claim 10 wherein the elongated stiff tail member makes an acute angle with the axis of symmetry of the blade.

12. An improved fishing lure of the type that includes a blade, the blade being shaped like the bowl of a spoon with a convex surface and an opposite coextensive concave surface, the two surfaces terminating in a common peripheral edge, and the blade having first and second holes adjacent to opposite edges of the bowl, means for connecting a fishing line to the lure, and means for connecting a fish hook to the second hole, wherein the improvement comprises:

said means for connecting a fish hook to the second hole comprising a stiff wire having a first end and a second end, the first end being rigidly secured to the first hole in the blade, and the wire extending from the first hole through the second hole of the blade and for a substantial distance beyond the adjacent edge thereof to form a stiff tail portion; said tail portion of the stiff wire between the second hole of the blade and the second end of the wire is offset from an extension of a line between the first and second holes of the blade;

a plurality of beads strung on the portion of the wire tail extending from the second hole of the blade to the second end of the wire, the density of the beads being substantially greater than the density of water such that the weighted tail portion is heavier than the blade; and means for attaching a fish hook to the second end of the wire tail, whereby the leverage exerted by the stiff weighted tail member on the blade is adapted to cause the lure to oscillate in a rolling motion, but without spinning, when the lure is pulled through the water by a fishing line attached to the first hole.

13. The fishing lure of claim 12 wherein the length of the stiff wire tail portion between the second hole of the blade and the second end of the wire is longer than the distance between the first and second holes of the blade.

14. The fishing lure of claim 12 wherein the length of the stiff wire tail portion between the second hole of the blade and the second end of the wire is approximately twice as long as the distance between the first and second holes of the blade.

15. The fishing lure of claim 12 wherein the stiff wire is made of stainless steel, and the beads are made of brass.

16. The fishing lure of claim 12 wherein the stiff wire extends between the first and second holes of the blade contiguous to the convex surface of the blade.

17. The fishing lure of claim 12 wherein the portion of the stiff wire between the first and second holes of the blade extends across the bowl of the spoon from the first hole to the second hole, and the means for connecting a fishing line to the lure comprises means slidably mounted on said wire portion between the first and second holes for attachment of a fishing line.

18. The fishing lure of claim 12 wherein the plurality of beads increase in size and weight progressively along the stiff wire tail portion from adjacent the blade to adjacent the hook, whereby the center of gravity of the weighted tail portion is offset toward the second end of the wire.

19. A fishing lure according to claim 1 wherein the means for connecting a fishing line to the first attachment location on the blade comprises:
 a straight wire extending across the bowl of the blade from the first attachment location to adjacent the edge on the opposite side of the bowl and
 means slidably mounted on said wire between the first and second locations for attachment of a fishing line.

20. A fishing lure according to claim 19 further comprising spacer means threaded on said wire for spacing the slidable line attachment means a predetermined distance from the first attachment location.

* * * * *

UNITED STATES PATENT AND TRADEMARK OFFICE
CERTIFICATE OF CORRECTION

PATENT NO. : 4,142,319
DATED : March 6, 1979
INVENTOR(S) : Miroslav Mihaljevic

It is certified that error appears in the above-identified patent and that said Letters Patent are hereby corrected as shown below:

```
Column 4, line 34, delete "of" (third occurrence)
and insert --be--

Column 5, line 33, delete "aboe" and insert --able--

Column 6, line 10, delete "unually" and insert --usually--

Column 6, line 34, delete "previouly" and insert
--previously--

Column 7, line 14, delete "end" and insert --and--

Column 7, line 19, delete "oh" and insert --on--

Column 7, line 34, delete "located" and insert --location--

Column 8, line 68, delete "contiguoug" and insert
--contiguous--
```

Signed and Sealed this

Seventeenth Day of March 1981

[SEAL]

Attest:

RENE D. TEGTMEYER

*Attesting Officer*　　*Acting Commissioner of Patents and Trademarks*